Dec. 25, 1928.

J. M. HALL 1,696,478

SHOCK ABSORBER

Filed June 5, 1925

Inventor
Joseph M. Hall
By Popp & Powers
Attys

Dec. 25, 1928.
J. M. HALL
1,696,478
SHOCK ABSORBER
Filed June 5, 1925.  2 Sheets-Sheet 2
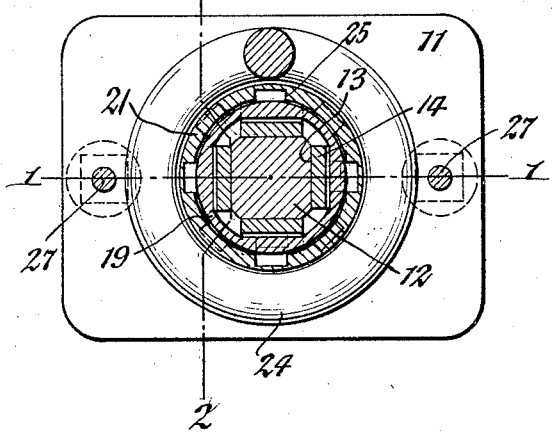
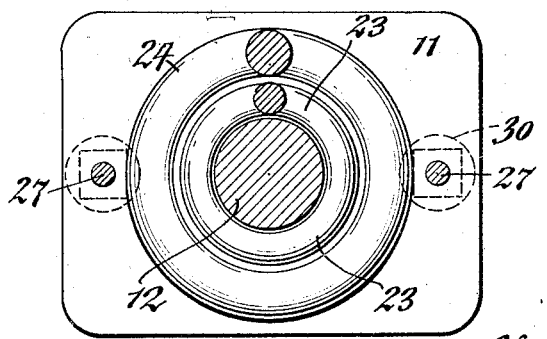
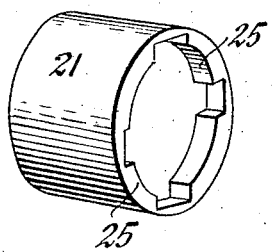
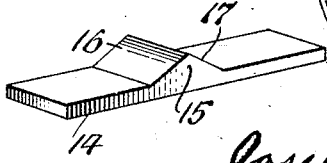
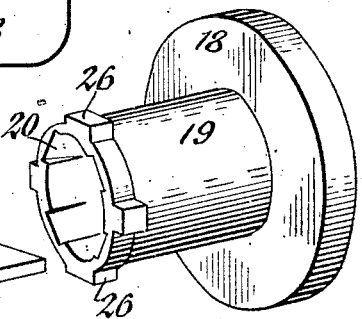

Patented Dec. 25, 1928.

1,696,478

UNITED STATES PATENT OFFICE.

JOSEPH M. HALL, OF HAMILTON, ONTARIO, CANADA.

SHOCK ABSORBER.

Application filed June 5, 1925. Serial No. 35,099.

This invention relates to a shock absorber which is more particularly designed for use in railway rolling stock in order that shock set up while handling the same may be absorbed either wholly or in part by means of spring and frictional resistance or cushioning means.

It is the object of this invention to provide a shock absorber of this character which is comparatively simple in construction and low in cost, which is very efficient in operation in proportion to the amount of metal in the same, and which will not only serve to effectively cushion the shock when the absorber is closed by a buffing or pulling load but will also check the recoil or opening movement of the absorber when the load is removed therefrom and thus avoid undue shock in either case.

In the accompanying drawings:

Figures 3 and 4 are vertical transverse sections taken on the correspondingly numbered lines in Figure 1.

Figures 5, 6 and 7 are perspective views of the wedge collar, thrust member and one of the friction shoes of the absorber.

Similar characters of reference indicate like parts throughout the several views.

The numerals 10, 11 represent two followers which may be mounted in the usual and well known manner between the two longitudinal draft sills of the car frame and front and rear stops thereon so as to prevent the followers from moving any further one away from the other but permitting each follower to move toward the other when the absorber is subjected to a buffing or pulling action while in service.

Figure 1:
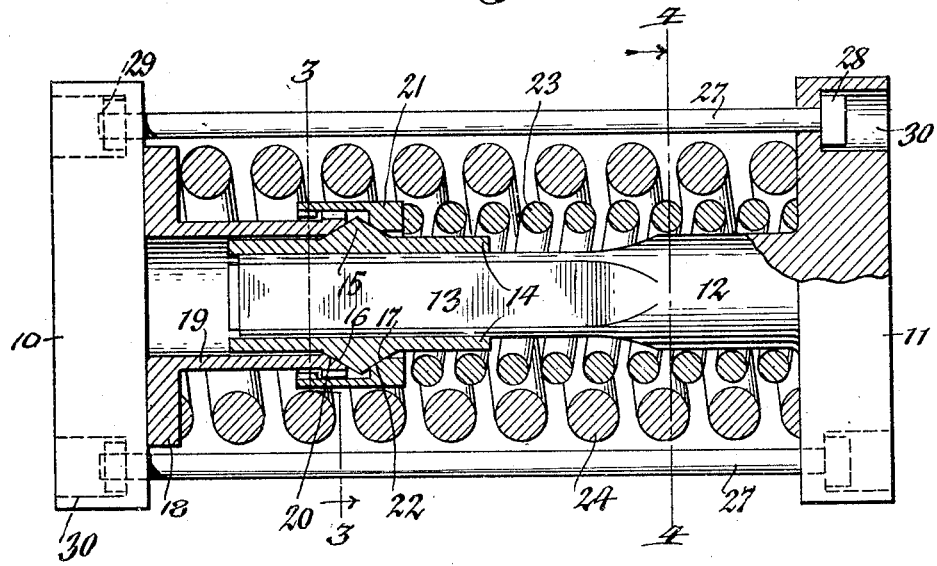
Figure 1 is a plan view partly in section of the improved absorber the section being taken on line 1—1, Fig. 3, and showing the same in a fully opened or relaxed position.
Figure 2:
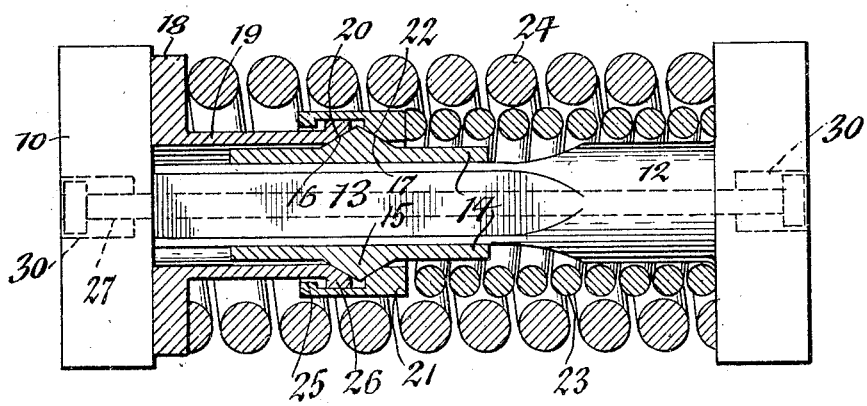
Figure 2 is a side view partly in section the section being taken on line 2—2, Fig. 3 and showing the absorber in its fully closed condition.

One of these followers, for example the follower 11, is provided with a longitudinal friction post or stem 12 preferably formed integrally therewith and projecting inwardly from the central part thereof toward the other follower. The inner end of this friction post or stem is provided with a plurality of longitudinal flat sides or friction faces 13, in this instance four in number, arranged equidistantly around the circumference of the post. Each of these friction faces is engaged by the inner flat side of a friction shoe 14 which is adapted to slide lengthwise thereon. On its outer longitudinal side each of these friction shoes is provided with a laterally projecting rib 15, the front and rear sides of which are provided with inclined faces 16, 17 which converge laterally, as shown in Figures 1, 2 and 7. The inner side of the other follower is engaged by the base 18 of a thrust member which in effect forms part of the respective follower and is provided with a tubular neck or sleeve 19 projecting inwardly from the central part of the thrust base and surrounds the adjacent parts of the friction post and friction shoes. On the bore of its inner end the thrust sleeve is provided with a plurality of rear inclines 20 each of which engages one of the front inclines 16 of one of the friction shoes so as to have wedging engagement therewith.

Surrounding the several friction shoes and the adjacent parts of the friction post and the inner part of the thrust sleeve is a wedge collar 21 the inner part of which is provided in its bore with a plurality of inclines 22 each of which engages with the rear incline 17 of one of the friction shoes, as shown in Figures 1 and 2.

A comparatively light wedge spring 23 preferably of helical form surrounds the outer part of the friction post or stem and the rear ends of the friction shoes and bears at its inner end against the front end of the wedge collar while its outer end bears against the inner side of the follower 11.

A heavier thrust spring 24 also of helical form surrounds the wedge spring, shoes, wedge collar and thrust sleeve and bears at one end against the base or flange 18 of the thrust member and at its other end against the opposite follower 11, as shown in Figures 1 and 2.

In order to prevent the thrust member and wedge collar from becoming wholly separated after they have once been assembled and thus facilitate manipulation of the same while completing the assemblage and installation of the absorber coupling or retaining means are provided which preferably consist of a plurality of stop lugs 25 arranged in an annular row in the bore of the wedge collar at the front end thereof, and a plurality of stop lugs 26 arranged on the periphery of the thrust sleeve at the front end thereof, the spaces between the lugs on the collar and the sleeve being so spaced and of such width that the lugs of each of these members can pass through the spaces between the lugs of the other member when the same are turned circumferentially in the proper position to bring the lugs of each of these members in line with the spaces between the lugs of the other member. When the lugs of the thrust sleeve are moved into the wedge collar and these members are turned sufficiently to bring the corresponding lugs of the same in line then the collar and sleeve cannot be pulled apart because their lugs engage each other.

Upon assembling the several parts of the absorber the wedge and thrust springs are subjected to an initial tension so that an initial load is on the same when the followers are mounted on the draft sills of the car frame and are separated into their fully open position into engagement with the front rear stops of the sills. In order to hold the followers in this initial position and prevent the same from spreading under the resilience of the springs when the absorber is removed from the car staying means are provided which in this instance consist of two tie rods 27 arranged lengthwise on opposite sides of the springs and passing through corresponding ends of the followers and bearing with heads and nuts 28, 29 respectively against the outer sides of the followers, the latter being provided with recesses 30 to receive said heads and nuts.

When the absorber is subjected to a pushing or pulling action one of the followers moves toward the other, thereby compressing the thrust spring and increasing its resistance and causing the same to absorb a portion of the shock. The movement of the follower toward the other at this time is also frictionally resisted to some extent by reason of the wedging engagement of the wedge collar and thrust sleeve with the friction shoes, whereby the latter are pressed against the friction post or stem. As the thrust sleeve moves inwardly or forwardly relatively to the wedge spring the increasing resistance offered by the latter produces a correspondingly increased wedging action of the wedge collar and thrust sleeve on the shoes whereby the latter are pressed laterally inward against the friction post which results in still further increase in frictional resistance until the maximum cushioning effect is reached by the front end of the post striking the follower 10, at which time the absorber becomes solid. Upon releasing the load on the absorber the frictional action of the shoes against the friction post is still set up to a certain extent instead of being wholly free, thereby checking the opening movement of the absorber and reducing the recoil of springs at this time.

It is to be noted that in this absorber there is no release action on the friction members, that friction is set up both when closing and opening the draft gear, and that when closing the friction members the cushioning capacity of the same is added to that of the springs but when opening the gear the friction effect is utilized to reduce recoil of the springs.

By changing the angles of the wedging inclines on the shoes, collar and sleeve the frictional resistance may be varied more or less in either direction to suit particular conditions.

This invention therefore comprehends broadly a structure in which frictional means are combined with a spring whereby added capacity is obtained in closing the gear, and in opening the gear a frictional resistance is set up which reduces the recoil effect of the spring and effects a partial absorption of the shock.

I claim as my invention:—

1. A shock absorber comprising two relatively movable followers, a longitudinal friction post movable with one of said followers and projecting toward the other follower and having longitudinal friction surfaces, friction shoes engaging said friction surfaces, a wedge collar having backward wedging engagement with said shoes, a thrust member moving with the other follower and having forward wedging engagement with said shoes, a wedge spring surrounding said post and bearing at its opposite ends against said wedge collar and the follower which carries said post, a thrust spring surrounding said wedge spring and operating to move said thrust member and the follower with which it engages in one direction, and said follower which carries said post in the opposite direction, and mean for causing said wedge collar to move backwardly with that follower toward which said post projects.

2. A shock absorber comprising two relatively movable followers, a longitudinal friction post movable with one of said followers and projecting toward the other follower and having external longitudinal friction surfaces, friction shoes engaging said external friction surfaces, a wedge collar having backward wedging engagement with said shoes, a thrust member engaging the other follower and having forward wedging engagement with said shoes, a wedge spring surrounding said post and bearing at its opposite ends against said wedge collar and the follower which carries said post, and a thrust spring surrounding said wedge spring and bearing at its opposite ends against said thrust member and said collar which carries said post.

3. A shock absorber comprising two relatively movable followers, a longitudinal friction post movable with one of said followers and projecting toward the other follower and having longitudinal friction surfaces, friction shoes engaging said friction surfaces, a wedge collar having backward wedging engagement with said shoes, a thrust member engaging the other follower and having forward wedging engagement with said shoes, a wedge spring surrounding said post and bearing at its opposite ends against said wedge collar and the follower which carries said post, a thrust spring surrounding said wedge spring and bearing at its opposite ends against said thrust member and said collar which carries said post, and means for coupling said wedge collar and thrust sleeve.

4. A shock absorber comprising two relatively movable followers, a longitudinal friction post movable with one of said followers and projecting toward the other follower and having longitudinal friction surfaces, friction shoes engaging said friction surfaces, a wedge collar having backward wedging engagement with said shoes, a thrust member engaging the other follower and having forward wedging engagement with said shoes, a wedge spring surrounding said post and bearing at its opposite ends against said wedge collar and the follower which carries said post, a thrust spring surrounding said wedge spring and bearing at its opposite ends against said thrust member and said collar which carries said post, and means for coupling said wedge collar and thrust sleeve comprising a plurality of inwardly projecting lugs on said wedge collar forming forwardly facing shoulders, and a plurality of outwardly projecting lugs on said thrust sleeve forming rearwardly facing shoulders adapted to engage said forwardly facing shoulders.

5. A shock absorber comprising two relatively movable followers, a longitudinal friction post movable with one of said followers and projecting toward the other follower and having longitudinal friction surfaces, friction shoes engaging said friction surfaces, a wedge collar having backward wedging engagement with said shoes, a thrust member engaging the other follower and having forward wedging engagement with said shoes, a wedge spring surrounding said post and bearing at its opposite ends against said wedge collar and the follower which carries said post, a thrust spring surrounding said wedge spring and bearing at its opposite ends against said thrust member and said collar which carries said post, and means for coupling said wedge collar and thrust sleeve comprising a plurality of inwardly projecting lugs on said wedge collar forming forwardly facing shoulders, and a plurality of outwardly projecting lugs on said thrust sleeve forming rearwardly facing shoulders adapted to engage said forwardly facing shoulders, the spaces between the lugs on the collar and the sleeve being of such width that the lugs of each of these members can pass through the spaces between the lugs on the other member.

6. A shock absorber comprising two followers movable lengthwise relatively to each other, a longitudinal friction post formed integrally with the central part of one of said followers and projecting toward the other and provided on its exterior with a plurality of longitudinal friction surfaces, a plurality of friction shoes arranged in an annular row around said post and each engaging its inner side with one of the friction surfaces thereof and provided on its outer side with a lateral projection which has laterally converging front and rear inclines on its opposite sides, a thrust member having a base engaging with the inner side of that follower toward which said post projects and having a thrust sleeve surrounding said post and shoes and provided with inclined faces engaging with the front inclined faces of said shoes, a wedge collar surrounding said shoes and provided with inclines engaging with the rear inclines of said shoes, a wedge spring interposed between said wedge collar and the follower which carries the post, and a thrust spring interposed between said followers and encircling said post.

7. A shock absorber comprising two followers movable lengthwise relatively to each other, a longtitudinal friction post formed integrally with the central part of one of said followers and projecting toward the other and provided on its exterior with a plurality of longitudinal friction surfaces, a plurality of friction shoes arranged in an annular row around said post and each engaging its inner side with one of the friction surfaces thereof and provided on its outer side with a lateral projection which has laterally converging front and rear inclines on its opposite sides, a thrust member having a base engaging with the inner side of that follower toward which said post projects and having a thrust sleeve surrounding said post and shoes and provided with inclined faces engaging with the front inclined faces of said shoes, a wedge collar surrounding said shoes and provided with inclines engaging with the rear inclines of said shoes, a wedge spring interposed between said wedge collar and the follower which carries the post, a thrust spring interposed between said base and the follower which carries said post, and means for coupling said thrust sleeve and wedge collar consisting of a plurality of outwardly projecting lugs arranged on the sleeve and forming outwardly facing shoulders and a plurality of inwardly projecting shoulders arranged on the wedge collar and forming forwardly facing shoulders adapted to engage with the rearwardly facing shoulders on said thrust sleeve.

8. A draft gear for railway cars comprising a pair of followers, a thrust member associated with one of said followers, inclined wedging faces on said member, a friction post, a collar encircling said post and having wedging faces, friction shoes, said shoes being provided with oppositely arranged wedging faces for cooperating with the wedging faces of said thrust member and collar for forcing said shoes into frictional engagement with said post during the compression and release of said gear, respectively, resilient means for normally forcing said collar outwardly, and a heavy duty thrust spring engaging said followers for resisting the compression of said gear.

9. A draft gear for railway cars comprising a pair of followers, a heavy duty spring between said followers for resisting compression of the gear and for restoring the parts to normal position after compression, a friction post associated with one of said followers, friction shoes, means including members having cooperating wedging faces for forcing said shoes laterally against said post for frictionally resisting the movements of said followers to and from each other, and means for maintaining said members under spring compression.

In testimony whereof I affix my signature.

JOSEPH M. HALL